United States Patent [19]

Ackerman et al.

[11] Patent Number: 5,649,131

[45] Date of Patent: Jul. 15, 1997

[54] COMMUNICATIONS PROTOCOL

[75] Inventors: Chaim M. Ackerman, Lakewood; Alan L. Glasser, Manalapan; Reuben Klein, East Brunswick, all of N.J.

[73] Assignee: Lucent Technologies Inc., Murray Hill, N.J.

[21] Appl. No.: 257,215

[22] Filed: Dec. 30, 1992

[51] Int. Cl.$^6$ ................................................. G06F 13/00
[52] U.S. Cl. .................. 395/335; 395/285; 395/242; 395/788
[58] Field of Search ..................... 395/325, 650, 395/200, 275, 700, 200.01, 200.05, 200.02, 280, 290, 285, 221, 242, 326, 329, 335, 339, 615, 788; 364/408, 407; 379/27, 28, 29, 93, 96, 122, 136

[56] References Cited

U.S. PATENT DOCUMENTS

| | | | |
|---|---|---|---|
| 4,853,952 | 8/1989 | Jachmann et al. | 379/88 |
| 5,107,419 | 4/1992 | MacPhail | 395/600 |
| 5,173,854 | 12/1992 | Kaufman et al. | 364/419 |
| 5,181,162 | 1/1993 | Smith et al. | 364/419 |
| 5,201,049 | 4/1993 | Shorter | 395/650 |
| 5,303,042 | 4/1994 | Lewis et al. | 348/14 |
| 5,303,379 | 4/1994 | Khoyi et al. | 395/700 |
| 5,345,553 | 9/1994 | Busboom et al. | 395/161 |
| 5,347,632 | 9/1994 | Filepp et al. | 395/200 |
| 5,361,350 | 11/1994 | Conner et al. | 395/600 |

OTHER PUBLICATIONS

Electrical Communication Laboratories Technical Journal, "Screen Control Program for an Advanced Data Terminal System", (original and English Translation) vol. 34, No. 1, 1985, Y. Ieyoshi et al, pp. 165–179.

*Primary Examiner*—Glenn A. Auve
*Attorney, Agent, or Firm*—Frederick B. Luludis

[57] ABSTRACT

The invention is directed to a communications protocol which facilitates the exchange of interface information between a host processor and a terminal, such as a workstation, smart phone, portable computer, etc., by associating an object that is to be displayed on the terminal display with a particular identifier, and by associating input information entered in response to a user manipulating a displayed object with the associated object identifier, rather than the location of the displayed object. Accordingly, a host processor may specify relative rather than specific attributes for an object that is to be displayed on a terminal display, thereby leaving it up to the terminal to display an object in accord with its own capabilities.

10 Claims, 13 Drawing Sheets

| COMMAND MESSAGE FORMAT | |
|---|---|
| COMMAND | FORMAT |
| CREATE | id:CREATE:gid:type:properties |
| CHANGE | id:CHANGE:gid:type:properties |
| MOVE | id:MOVE:gid |
| ACTIVATE | gid:ACTIVATE |
| DESTROY | gid:DESTROY |
| DATAREQ | id:DATAREQ |
| VOICE | 0:VOICE |
| SESSION | <special format;restart msg framing> |
| FRAME | frid:FRAME |
| HOLDACK | 0:HOLDACK |

FIG. 3

PROPERTIES

| |
|---|
| id:CREATE:gid:CHOICE:\<attrib\>:\<label\>:\<datum\> |
| id:CREATE:gid:ENTRY:\<attrib\>:\<label\>:\<prompt\>:\<len\>:\<datum\> |
| id:CREATE:gid:TEXT:\<attrib\>:\<startbyte\>:\<datum\> |
| id:CREATE:gid:BITMAP:\<attrib\>:\<bit/row\>:\<datum\>:\<bitstream\> |
| id:CREATE:gid:SCRIPT:\<attrib\>:\<label\>:\<datum\>:\<script\> |
| id:CREATE:gid:REGION:\<attrib\>:\<datum\> |

FIG. 4

| OBJECT ATTRIBUTES | |
|---|---|
| TYPE | ATTRIBUTES |
| \<any object\> | HIDE |
| \<any group\> | RADIO |
| CHOICE | DEFAULT,NOTOUCH,COMMAND,POPUP |
| ENTRY | STRING,ALPHA,NUMBER,TELNO,MONEY,DATE,TIME,RAW,SECURE,NOTOUCH |
| TEXT | WORDWRAP,MORE,PROMPT |
| BITMAP | GROWABLE,SHRINKABLE,PROPORTIONAL,RUNLENGTH |
| REGION | HORIZONTAL,OUTER,UP |
| SCRIPT | ACTIVE |

FIG. 7

| REPERTORY DIAL CONTROLS | |
|---|---|
| PARAMETER | FUNCTION |
| W | WAIT FOR 30 SECONDS |
| P | PAUSE FOR TWO SECONDS |
| H | HANG-UP |
| + | WAIT FOR DIAL TONE(UP TO 15 SECONDS) |
| , | WAIT FOR ANSWER(REMOTE OFF-HOOK)(UP TO 15 SECONDS) |
| F | FLASH |
| <DIGIT,*,#> | DIAL DIGIT,'*',OR '#' |
| A,B,C,D | DIAL DTMF TONE A,B,C,OR D |
| S | WAIT FOR CARRIER,AND TRY TO ESTABLISH SESSION |
| - | NO-OP(PLACE HOLDER) |
| [n:INPUT:s] | SEND INPUT EVENT WITH id 'n' AND INFO 's' |

FIG. 5

| EVENT MESSAGE FORMAT |
|---|
| id:INPUT:frid:info |
| id:ERROR:info |
| id:REPLY:info |
| id:CONNECTED:info |
| id:HANGUP:info |
| 0:HOLD |

| FORMULA FUNCTIONS | |
|---|---|
| FUNCTION | RETURN |
| HANGUP(sec) | TERMINATE THE SESSION IN sec SECONDS |
| BEEP(tone) | tone=0 - CONFIRMATION TONE; tone=1 - ACKNOWLEDGEMENT TONE; tone=2 - ERROR TONE |
| FIND(label) | RETURN ID OF OBJECT WITH LABEL lable |
| EVAL(id) | EVALUATE DATUM FORMULA OF OBJECT id |

COMMUNICATIONS PROTOCOL

FIELD OF THE INVENTION

The invention relates to communications protocols and more particularly relates to a protocol for exchanging messages between a transaction processor and a computer terminal.

BACKGROUND OF THE INVENTION

A host computer (processor) that communicates with different types of computer terminals usually customizes a command so that the command is in a form expected by the terminal that is currently communicating with the host. If a command is not so customized, then the terminal might possibly execute a process in a way not intended by the host. For example, if the command pertains to displaying a particular pattern, then the terminal might possibly display some variation of that pattern.

To deal with that possibility, the host initially requests the identity (model) of a computer terminal as a way of identifying the characteristics defining the display associated with the computer terminal. Such characteristics include, e.g., the size, shape, aspect ratio and resolution of the terminal display. Once it knows such characteristics, the host may then properly format a display command so that it suits the computer terminal. One such command includes the location at which a pattern, or symbol, is to be displayed on the terminal display. The host specifies such a location so that it may maintain in its internal memory a map of the locations at which symbols are to be displayed on the terminal display.

For example, one display pattern that a host computer typically transmits to a terminal is a so-called menu defining a list of selectable items (e.g., services). A user operating the terminal may select one of the displayed menu items using any one of a number of different input devices. One such input device is a conventional computer keyboard associated with a displayed screen cursor. To select a desired menu item, the user moves the screen cursor in a conventional manner to the displayed item and then operates an appropriate keyboard button, e.g., the Enter key. However, the movement of the displayed cursor is typically under the control of the host computer. That is, if the user moves the screen cursor in a particular direction (up, down, left or right), then the associated computer terminal sends a message indicative of that fact to the host computer. The host computer, in response thereto, returns a message directing the terminal to move the screen cursor a number of units in the identified direction. The host computer also tracks the new display location of the screen cursor in its associated memory map.

Once the screen cursor is positioned on the desired menu item, the user may then operate the Enter key. The user's terminal in response thereto notifies the host computer that the user operated the Enter key. The host computer, in turn, correlates the operation of the Enter key with the position of the screen cursor using its stored map of the display, and therefore determines that the screen cursor is positioned on a menu item. Accordingly, the host computer interprets the message as a request to invoke the selected menu item. A terminal device and host computer may reduce the level of communications that they exchange during a transaction session by using what is commonly referred to as a "block mode". In the block mode, the terminal accumulates the user's input until the user operates a transmit key. At that point, the terminal device transmits the user's accumulated input to the host processor. However, in either case, the host needs to maintain precise knowledge of the terminal display, especially the size of the display, in order to properly format the presentation of information to a user.

SUMMARY OF THE INVENTION

Based on the foregoing, we have recognized that there is a need for a communications protocol that is independent of the host transaction processor as well as the operating characteristics of different types of terminals, workstations and/or so-called smart phones that the host might communicate with. Thus, an advancement in the art is achieved by providing a communications protocol for exchanging application interface information between a host computer and user terminal, workstation or smart phone, in which the host, in accord with an aspect of the invention, associates different types of objects with respective identifiers and then transmits an object type and its associated identifier to the terminal device. The terminal device, in turn and in accord with an aspect of the invention, displays the object in a form determined solely by the terminal device but in accordance with respective predefined policies. If a user manipulates a displayed object type then, in accord with an aspect of the invention, data representative of such manipulation is generated and transmitted with the associated object identifier to the host processor.

BRIEF DESCRIPTION OF THE DRAWING

In the FIGS:

FIG. 3 shows the format of the Create command of FIG. 2 in more detail;

FIG. 4 lists in table form the attributes associated with the Create command of FIG. 3;

FIG. 5 illustrates the formats of a number of different types of event, or input, messages that a terminal may transmit to the transaction processor of FIG. 1;

FIG. 7 illustrates so-called repertory telephone functions that are included in the inventive communications protocol;

DETAILED DESCRIPTION

Figures 1, 2:
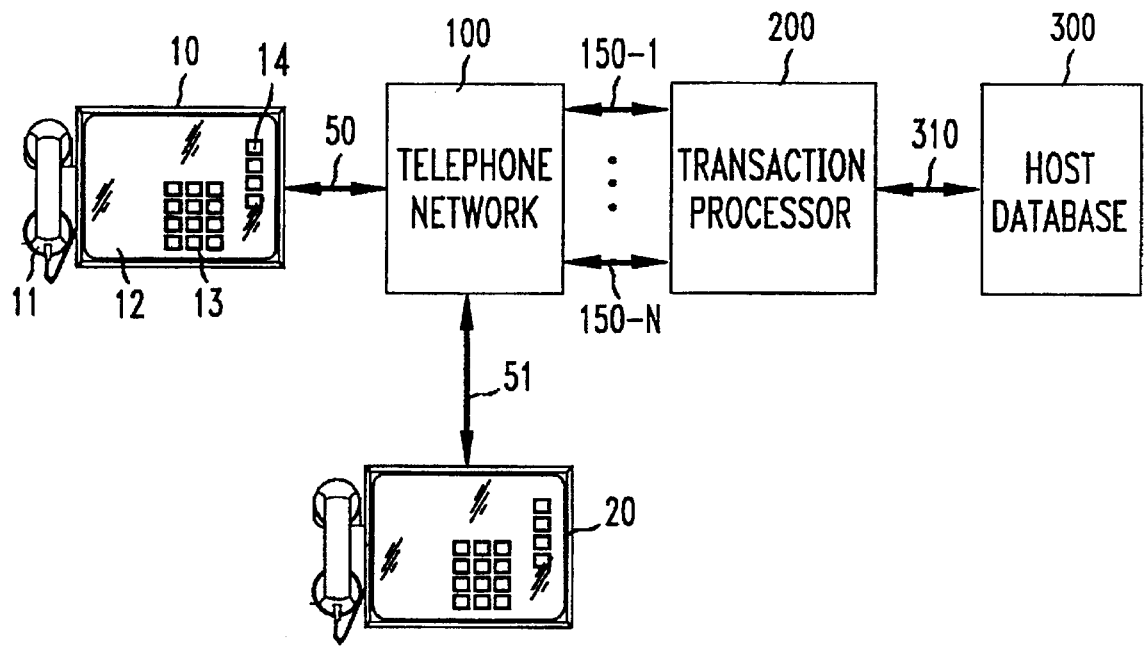
FIG. 1 is a broad block diagram of a system in which the principles of the invention may be practiced.
FIG. 2 illustrates the format of various commands that may be exchanged between the transaction processor and one of the terminals of FIG. 1.

The following discussion of an illustrative embodiment of the invention is given in the context of a so-called smart phone, two of which are shown in FIG. 1, namely station sets 10 and 20. As is well-known, a smart phone may be used as a conventional telephone station set or as a data terminal. As illustrated specifically for station set 10, the smart phone includes telephone handset 11, a display 12 integrated with a touch-sensitive screen and telephone circuitry. It also includes a conventional data modem (not shown). The display and touch screen, more particularly, provide a mechanism for a user to input instructions to the smart phone. Such instructions may relate to establishing a simple telephone call. They may also relate to a complex data transaction involving transaction processor 200, during the course of which a smart phone, e.g., station set 10, and processor 200 communicate with one another in accord with the inventive communications protocol.

More particularly, processor 200 is a multiuser computer that is programmed to implement the principles of the invention and to implement a particular transaction service, for example, a banking service associated with host database 300. Users operating respective data terminals that have been programmed in accord with the invention may also "dial up" processor 200 and communicate therewith in order to invoke and interface with the particular transaction service. Assume that one such user is the user associated with station set 10 who places a call to processor 200 in a conventional manner. The user dials such a number by first touching display 12, which causes a processor (not shown) within station set 10 to display on display 12 a representation of a telephone keypad 13 and a plurality of command buttons 14. The user may then enter the processor 200 telephone number by touching the appropriate digits of displayed keypad 13. Station set 10, in response to such touching, transmits over line 50 a conventional dual-frequency (Touch-Tone) signal representing the telephone number thus entered.

Telephone network 100, in response thereto, establishes a communications connection to an idle line, e.g., line 150-1, connecting to processor 200. A modem contained in the processor 200 input port connected to line 150-1 responds to the incoming call in a conventional manner, i.e., by exchanging messages with the modem contained in station set 10 in order to negotiate a mutually acceptable operating mode including the transmission rate that they will use for the transmission of data (messages).

Once the operating mode is established, station set 10 transmits what we call a "Connected" message identifying station set 10, in which the identifying information may include, for example, a unique serial number assigned to station set 10. Such identifying information may include information identifying other aspects of station set 10, such as, for example, terminal type and/or model number. Processor 200, in turn, acknowledges receipt of the connected message by returning a "Session" message containing the identifying information that it received from station set 10. Processor 200 then begins transmitting ("downloading") a series of objects. These objects are interpreted by station set 10 in accordance with a set of predefined specifications, or policies, relating to the way different types of objects (or symbols) should be presented to a user, i.e., displayed on display 12. It is noted that another terminal, e.g., station set 20, may utilize another somewhat different set of policies in presenting the objects to a user. In accord with an aspect of the invention, each such object type has a unique identity (or name). Station set 10, in turn, stores each such object and its associated identity in memory (not shown) internal to station set 10.

At any point in time during the transaction session, processor 200 may direct station set 10 to activate a set, or group, of one or more objects. Such activation causes station set 10 to define an object type in accord with the associated policy and to display the defined object on display 12. Certain ones of the displayed objects may generate particular inputs when touched by the user, as will be explained below in detail. Station set 10, in response to such touching, forms an event, or input, message containing the particular input, and, in accord with an aspect of the invention, the identity of the active object touched by the user. Station set 10 then transmits the message to processor 200.

In accord with an aspect of the invention, a particular object type may be associated with a respective group of objects, the group being identified by a respective group identifier. An object type is thus identified, in accord with the invention, by its unique identity for the purpose of generating an input when the object is active and by an associated group identity for the purpose of activating the group. Accordingly, processor 200 may activate a group of objects by merely transmitting to station set 10 a single activation message containing the group identity of the particular group. Station set 10, in response to the message, activates (e.g., displays) each object associated with the particular group identity.

The format of a processor 200 command that specifies an object type, as well as other commands, is shown in FIG. 2. Each command has at least two fields, the second of which is an action field which specifies the command itself. Two of those commands, ACTIVATE and DESTROY, each have one other field, which is an identity field. Specifically, the ACTIVATE command activates those object types whose group identifier (gid) is contained in the identity field (gid) of that command. The DESTROY command causes station 10 to erase from its internal memory those objects whose group identifier is contained in the associated identity field. (It is noted that, due to memory limitations, a station set, e.g., station set 10, may, on its own initiative, erase a group of objects from its internal memory in order "free up" memory space for the creation of a new group of objects. Thereafter, if station set 10 receives a processor 200 command identifying the erased group of objects, then station set 10, in response to that command, may request a retransmission of the processor 200 commands that created the erased group of objects.)

In certain applications, a station set 10 user who is communicating with the processor 200 application program may require the assistance of a live attendant associated with the service that the application program implements. For example, if the application implements a banking service, then the application program may transmit a command indicative of a symbol labeled "Attendant" or "Teller" to station set 10. If the user touches that symbol when it is displayed, then station set 10 sends a message indicative of that action to processor 200. The processor 200 application program, in response to receipt of the message, sends a VOICE command to station set 10. In accord with an aspect of the invention, the VOICE command directs station set 10 to drop its carrier signal as a means of changing the data connection between station set 10 and processor 200 to a voice connection. When station set 10 terminates its carrier signal, the application program, in a conventional manner, bridges an attendant onto the connection. Thereafter, when the attendant and station set 10 user end their communications, processor 200 may cause the voice connection to be changed back to a data connection by transmitting a carrier signal. Upon receipt of the carrier signal, station set 10 transmits a session command message to processor 200.

In certain situations, transaction processor 200 may have a need to obtain certain information associated with a particular object from a station set that is communicating with processor 200. Processor 200 may obtain such information by inserting the identity of that object in the id field of a DATAREQ command and sending the command to the station set. Transaction processor 200 may also move a particular object from one group to another group of objects. To do so, transaction processor 200 respectively inserts the identities of the particular object and other group in the id and gid fields of a MOVE command and sends the command to the station set. (It is noted that the FRAME and HOLD-ACK commands are discussed below in connection with FIGS. 15 and 9, respectively.)

It is seen from FIG. 2, that the CREATE and CHANGE commands include additional fields relating to the type as well as the properties of an object that is created or changed. An expanded version of the format of the CREATE command is shown in FIG. 3. It is noted that the following discussion relating to the type and property fields of the CREATE command pertains to the CHANGE command.

Specifically, a CREATE command may refer to one of a number of different types of objects, e.g., six objects each associated with a particular function. Such types of objects include: CHOICE, which may be selected by a user when displayed; ENTRY, which solicits input from a user when displayed; TEXT, which provides information to a user when displayed; BITMAP, which requests the display of a particular bit-map pattern, for example, a logo; REGION, which associates the display of objects with a particular display region and SCRIPT, which is software that processor 200 may download to a station set, e.g., station 10. Of the various types of objects, REGION and SCRIPT are not displayed.

It is seen from FIG. 3 that each such object type is associated with a set of properties that is used to determine how the associated object type is to be displayed. As such, a terminal device interprets a set of properties, as well as associated attributes (discussed below), in accord with its own capabilities to create an object, or graphical symbol, characterizing the type of object specified in the associated CREATE command, as discussed below. It is also seen from the FIG. that a set of properties includes at least an attributes field and one or more other fields respectively pertaining to, for example, a label, data, prompt, etc.

More specifically, the attributes field associated with an object is a set of boolean values arranged in a bit-map field that control the presentation characteristics of an associated object. The attribute HIDE shown in FIG. 4, in particular, may be used to control the display of an object (i.e., its visibility on the display). The attribute RADIO may be used to provide a user with the option of changing a selection in the instance where the user may select only one object of a group of displayed objects. The remaining attributes shown in FIG. 4 are associated with respective object types.

Referring now to FIGS. 3 and 4, the properties segment of a command specifying a CHOICE object also includes label and datum fields. The label field may include either text or a so-called formula. The datum field of a CHOICE object typically includes a value which is inserted in a so-called Event message (discussed below) that is generated and sent to transaction processor 200 (FIG. 1) if the associated displayed CHOICE object is selected by a user.

The attributes field of a CHOICE object may specify one of four different attributes, namely, DEFAULT, NOTOUCH, COMMAND or POPUP. A DEFAULT attribute causes the associated displayed CHOICE object, to be redisplayed in a distinctive manner, e.g., highlighted, in the event that a user selects that object. If the selected DEFAULT object is a member of a RADIO group, and if the user selects another CHOICE object of the same group, then the previously selected CHOICE object is redisplayed without such distinction, e.g., without being highlighted. The NOTOUCH attribute may be used to indicate that the associated CHOICE object when displayed is not selectable by the user. The COMMAND attribute may be used to cause the associated CHOICE object to exhibit a momentary action when the object is displayed and selected by a user. For example, the displayed object should function as a pushbutton. The POPUP attribute may be used to distinguish a displayed object from other such objects. For example, a so-called "drop shadow" may be added to a displayed object to provide such distinction.

The ENTRY object and fields comprising its associated properties is one mechanism which transaction processor 200 (FIG. 1) may use to solicit information from a user. For example, a user prompt, such as, for example, "Enter your account number", may be inserted in the prompt field. The user's response (input) to the prompt is then inserted in the datum field of the displayed ENTRY object and is also inserted in a so-called input (Event) message identified by the id associated with that object. The input message is then forwarded to transaction processor 200.

If a station set, e.g., station set 10 (FIG. 1), that is communicating with processor 200 does not have a keyboard and/or a display of sufficient size to accommodate a number of displayed entry prompts, then each associated ENTRY object may be displayed as a button with an abbreviated "label" identifying its functionality. For example, the label may specify "a/c No.". If the user selects that button, then the terminal displays the full prompt, e.g., "Enter your account number" and/or a qwerty type of keyboard for the entering of the called for information. The acceptable length of such an entry may be controlled by inserting a particular value in the "len" (length) property field of the associated ENTRY object. If the "len" field contains a zero, then the acceptable input may be of an arbitrary length.

As seen from FIG. 4, the display attributes of an ENTRY object include (a) "String", which defines a string of alpha-numeric characters including spaces, punctuations and symbols; (b) "alpha", which defines a string of alpha-numeric characters including apostrophes, commas, and dashes but not spaces; (c) "Number", which defines a simple calculator that is "operable" by a user to generate input; (d) "TelNo", which defines a telephone keypad that is operable by a user to enter a telephone number (the TelNo attribute may also include information for displaying telephone control buttons, such as, for example, "Flash", "Wait", etc.; (e) "Money", "Date", and "Time", which respectively define a money, date and time keyboard which is displayed when the associated object is selected by the user; and (f) "Raw", which indicates that input entered by a user in response to the associated displayed Entry prompt is to be forwarded immediately via an input event message to transaction processor 200.

A station set, such as station set 10 (FIG. 1) may have one or more limitations, namely, the size of its associated display and internal memory. In accord with the principles of the invention, a terminal that is communicating with transaction processor 200 manages its associated display itself, and manages its internal memory with the assistance of processor 200. In particular, during the exchange of session and connected messages, station set 10 sends a value defining a "chunksize" to processor 200, in which the "chunksize"

value is indicative of the number of characters that can be displayed at one time on the station set 10 display. Thereafter, if processor 200 sends text via a TEXT command to station set 10 then the number of bytes forming such text is at most equal to the station set 10 chunksize, in which such text is contained in the datum field of the associated TEXT command. Processor 200 identifies the start of such text using a startbyte whose value is defined in the "startbyte" field of the associated TEXT command. For example, a startbyte associated with a first chunk of text has a value of zero. If the chunk size happens to be 1024, then the next startbyte is 1024, and so on.

Accordingly, a station set need only store one chunk size of displayed text in its internal memory. If a user happens to enter a request to scroll to either a previous page or next page of displayed text, then the station set may send an event message identifying the startbyte of the desired page (chunksize) to processor 200. Upon receiving the desired text in an associated TEXT command, the station set displays the text and stores it in its internal memory, thereby overwriting the chunksize of text that had been previously stored therein.

Processor 200 may exercise some control over the way that a station set displays text contained in a TEXT command. In particular, the MORE attribute of the TEXT command may be used to indicate that an associated chunk of text that is to be displayed is not the last chunk and that the terminal may request additional chunks of text as the user requests them. The WORDWRAP attribute, on the other hand, may be used to indicate that a displayed line should end on a full word and not a broken word and the PROMPT attribute may be used to indicate that text may be truncated and not to be scrolled.

The BITMAP object of a CREATE command, more particularly, may be used by processor 200 to display an image, e.g., a logo, on station 10 in which the image is defined in the associated "bitstream field". If the associated attributes are not "turned on" then the station set may display the image without adjusting the display size of the image, but centering it within an associated predefined region on the display. In displaying a bitmap image, the terminal may use the contents of the associated "bits/row" field to interpret the contents of the "bitstream" field as a two-dimensional array of picture elements ("pixels") that begins at the upper left-hand corner of an associated display region and proceeds in a conventional manner, i.e., from left to right and top to bottom.

The BITMAP object includes a number of attributes as defined in FIG. 4. In particular, the Growable attribute is used to indicate that if the associated display region contains extra space, then the associated image should be scaled up accordingly. The Shrinkable attribute is used to specify the opposite case. That is if the entire image defined in the associated bitstream field cannot be displayed in the associated display region, then the image should be scaled down, rather then clipped. The Runlength attribute is used to indicate that the information contained in the associated bitstream field has been compressed using a particular data compression scheme, for example, the well-known run-length encoding scheme.

The SCRIPT object, in particular, may be used by an application program to download a software program contained in the associated script field to a terminal, e.g., station 10, in which the program is identified in the associated label field. The associated datum field may contain a so-called formula (discussed below), which may or may not be used by the program. It is seen from FIG. 4 that the SCRIPT object is associated with one attribute, Active, which may be used to indicate that script is to be displayed at the time it is downloaded to the station set, or device.

An application program running on transaction processor 200 may use the REGION object to organize its access to the display and memory associated with the computer terminal that is communicating with processor 200. That is, the REGION object is the means by which the application program partitions a display into regions for the displaying of particular information or images pertinent to the particular application that is running on processor 200. For example, a plurality of user selectable buttons may be displayed in one such region, and one or more control buttons may be displayed in another region, and so on. It is to be understood, however, that the way in which a display is actually partitioned into such regions is under the control of the station set or computer terminal, e.g., station 10.

In particular, a group region may contain either a number of subordinate regions, e.g., two regions or a number of nonregion objects (e.g., CHOICE object), but not both. In addition, a group region is associated with what we call a "primary direction". The primary direction specifies the layout of the members of a group region and the direction may be horizontal or vertical, with vertical being the default direction. For example, for horizontal direction, the first and second subordinate regions (or first and second nonregion objects) are respectively displayed at the left-hand and right-hand sides of the group region. For vertical direction, the first and second subordinate regions (or first and second nonregion objects) are respectively displayed at the top and bottom of the group region.

As shown in FIG. 4, the REGION object is associated with a number of attributes, namely, Horizontal, Outer and Up. The Horizontal attribute may be used to override the Vertical default direction. If the number of nonregion objects that are linked to a group region is more than the number that can be displayed in the primary direction, then the station set, e.g., station 10, may resort to using a secondary direction to display the additional nonregion objects. A default secondary direction may be used to display the nonregion objects in a new row for Horizontal direction or a new column for Vertical direction. We call the secondary default direction Inner. The attribute Outer may be used to override the default secondary direction and specifies an opposite direction. For example, the secondary direction for two such regions, namely, a command and application region, is typically Inner, the default direction. When nonregion objects are added to the application region, then they are displayed as a new column of objects at the right-hand side of that region. Whereas, when nonregion objects are added to the command region, then they are displayed as a new column of objects on the left-side of that region.

Further, when a new column is created, then in accord with a default mode nonregion objects are displayed starting at the top of the column. The attribute Up is used to reverse the latter direction such that nonregion objects are displayed starting at the bottom of a column.

Turning now to FIG. 5, there is shown the format of the various Event messages that a terminal device, such as station set 10, may use to transmit input information (message) to the transaction processor. Typically, an Event message, such as INPUT, is generated responsive to the user manipulating a displayed object. It is seen from the FIG. that the INPUT message contains the id of the manipulated displayed object as well as the id (frid) of the associated display frame (discussed below). An input message may also be an ERROR message (discussed below) or a REPLY message, in which the particular error or reply is contained in the associated "info" field. An input message may also be a Connected message (mentioned above), HANGUP message (relating to the user "hanging up" the associated terminal device), or HOLD message (relating to the user placing the associated terminal device in a "hold" state, as is done with a conventional telephone station set). (It is noted that the term "manipulating" and variants of that term as used herein is meant to include other terms that are understood by the art and which define similar functions. For example, it includes "touching" a displayed object as one would touch screen 12 of station set 10 to select a displayed object, moving a screen cursor to the location of a displayed object or text and operating, for example, an enter key, or even as identifying a particular displayed object or text or a menu of entries using terminal buttons, for example, computer keyboard buttons.)

Figure 6:
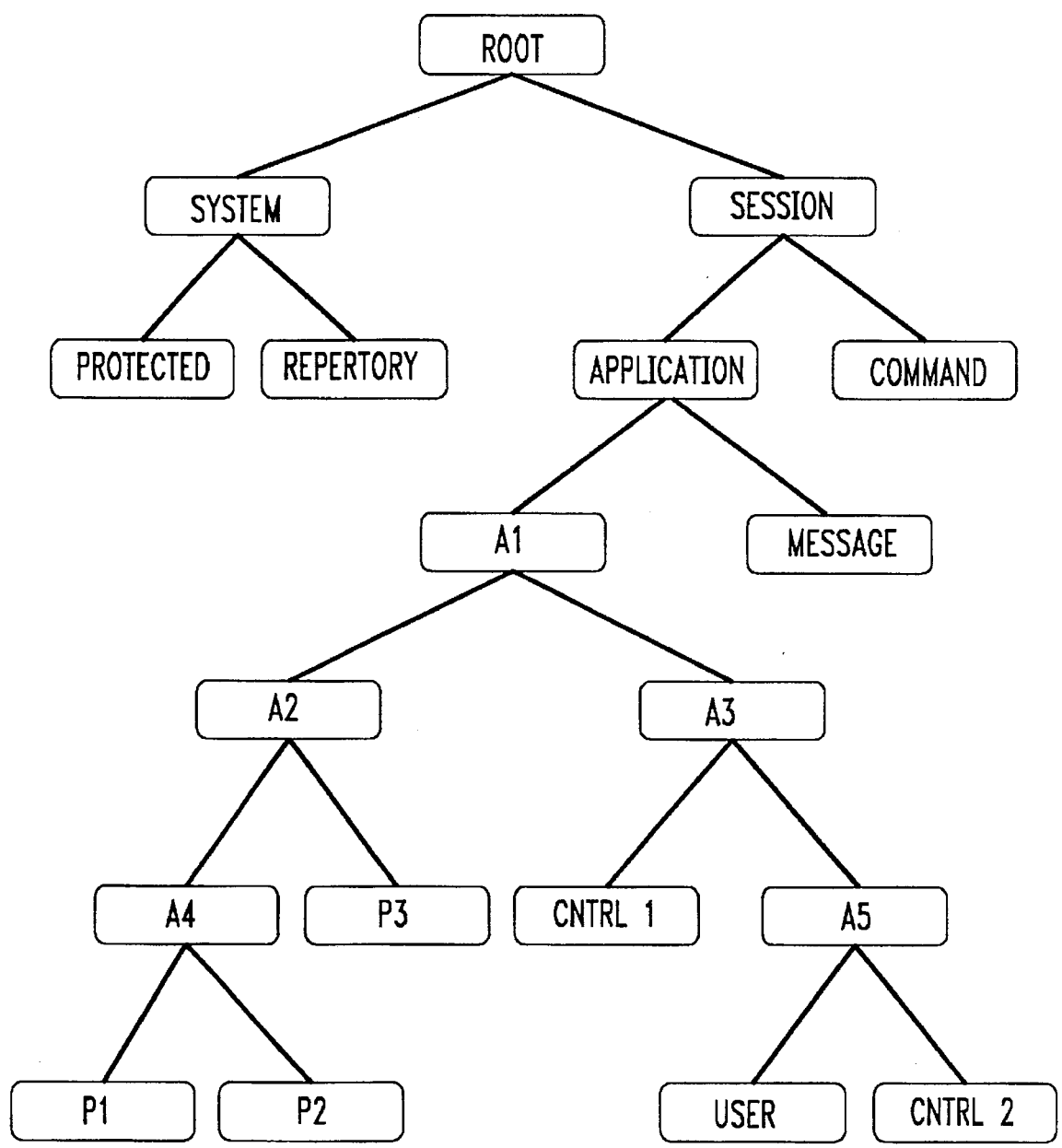
FIG. 6 is an illustrative example of one way in which the display of a terminal may be partitioned into hierarchical regions, in accord with the principles of the invention.

FIG. 6 is an illustrative example of one way in which a display, for example, the display of either a station set, e.g., station set 10, or a computer terminal, may be partitioned, in accord with an aspect of the invention, into a hierarchy of regions. More particularly, at the top of the hierarchy is a predefined Root region, which has an id of zero and which is associated with the total area of the display. The Root region, which cannot be destroyed, branches out into a treelike structure to two other regions, System and Session, which may be addressed as a group region object as a way of globally addressing objects associated with regions that descend from the Root region. For example, the "0:Destroy" command (FIG. 2) erases all regions that descend from the right-hand branch of the Root region. In essence, transaction processor 200 may clear the display of a station set that it is communicating with by transmitting the above command. As another example, transaction processor 200 may solicit information describing the capabilities of a station set by transmitting a "0:Datareq" command to the station set. The station set, in turn, responds to that command by transmitting a "0:Reply:text" message, in which the text field of the message contains the station set capabilities.

As seen from the FIG., the System region, or left-hand branch of the root region, relates to the memory of a station set, rather than the station set display. That is, a station set reserves a protected region and a repertory region in its internal memory. The session region, or right-hand branch of the root region, on the other hand, relates to the station set display, as will be discussed below.

Figures 8, 18:
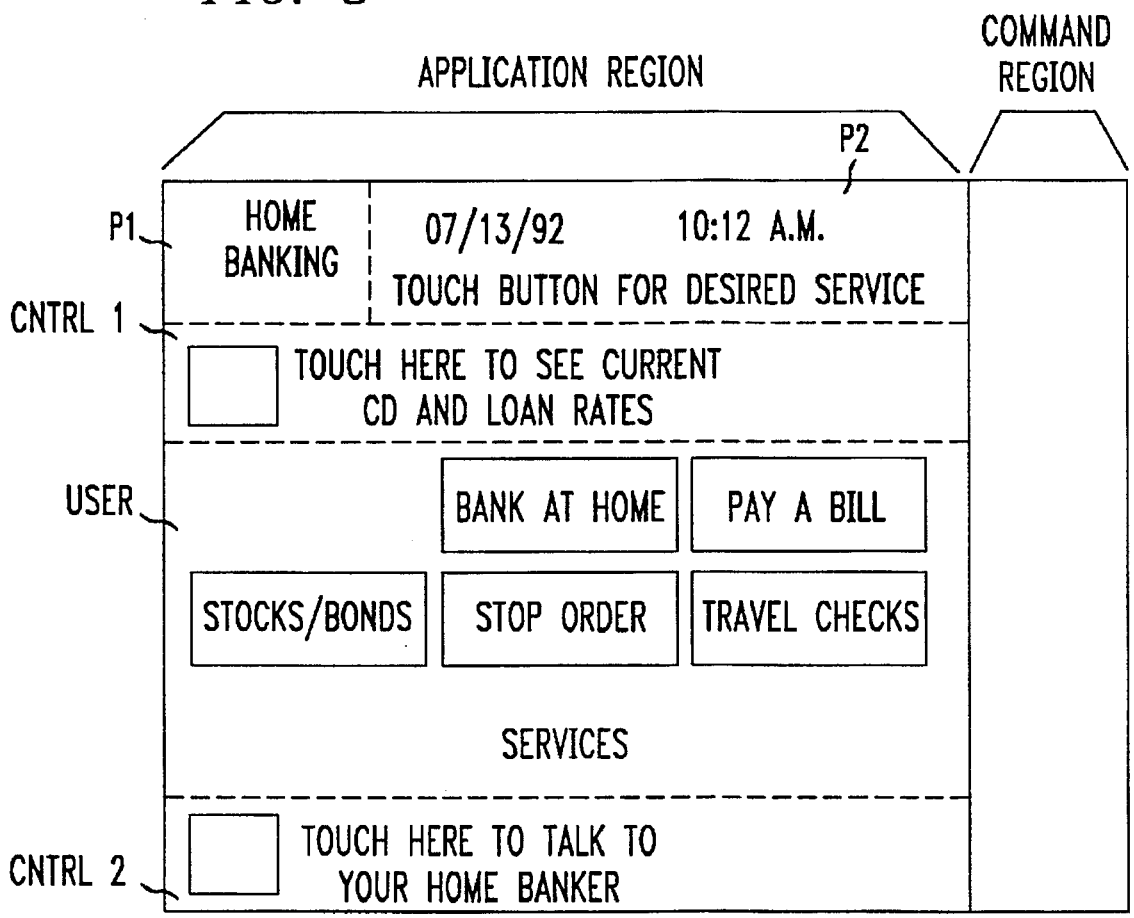
FIG. 8 is an example of the way in which a particular pattern of objects, or symbols, may be partitioned in accord with FIG. 5.
FIG. 18 illustrates the format of so-called formula functions that may be included in the inventive protocol.

The Protected region, in particular, is used for storing information and data, such as, for example, credit card numbers, social security numbers, addresses, etc., that is personal to the user and, therefore, is not displayed on the station set display. A transaction running on processor 200 may access the protected region only with the approval of the terminal user. The Protected region may also be used for the storage of predefined objects and/or objects specified by the user if the terminal provides that capability. A processor 200 application program may indirectly reference such protected information using a formula contained in a CHOICE or ENTRY object that is created during a current transaction session and that is stored in either the Application or Command region. When the application program activates such an object, the protected data is displayed on the station set display before it is transmitted to processor 200. In this way, the station set user may cancel or change the data before it is sent to the transaction program that is running on processor 200. A typical example of the foregoing command may be formatted as follows:

50:Create:30:Entry:Enter your full name:20:@Eval(Find ("User_Name")) where "@" indicates that the command includes a formula, namely Eval and Find. An expanded, self-explanatory Table of formula functions is shown in FIG. 18. When the transaction program activates object 50, the station set, in response thereto, displays the prompt "Enter your full Name". In addition, the station set application program responds to the formula "Find" by searching its protected memory to see if the user's full name has been stored therein. If it has, then the station set displays that information in response to the prompt. At that point, the user may prevent such information from being transmitted to the processor 200 application program by causing the displayed information to be erased from the display. Alternatively, the user may change the information and then cause it to be transmitted to the processor 200 application program.

As a further aspect of the protected region (or memory), the processor 200 application program may use a CHANGE command during a current transaction to change data stored in the Protected region or store data therein. Such a command, or object, is treated similar to so-called repertory "telephone dial" buttons (discussed below) except that such buttons cannot be accessed by the terminal user.

The terminal Repertory region, in particular, has a region id of "R: and is used for storing symbols representing repertory telephone buttons for invoking respective telephone functions. For example, such buttons may represent respective telephone numbers, and/or sequences of commands inputted by the terminal user. However, an application program running on processor 200 may not access the repertory region since that region is considered to be personal to the terminal user. Nevertheless, a capability is provided to allow an application program running on transaction processor 200 to add an object to the Repertory region. Specifically, during a transaction session the application program may send a CREATE command defining a repertory button and referencing the Repertory region in the associated group id field to station set 10. Station set 10, in response to receipt of the command, stores it in the repertory region of its associated internal memory. However, the application program cannot address that button or any other object stored in the terminal's Repertory region, as mentioned above.

Objects stored in the Repertory region are typically created by the user and accessed when the user's terminal is off-line, i.e., is not communicating with an application program running on transaction processor 200. One such object may be, for example, a repertory button whose associated datum field contains a particular telephone number. If the user selects that button, then the station set causes its associated telephone station set, e.g., station set 10 (FIG. 1), to go off-hook. The station set then outpulses (dials) the telephone number that is associated with the selected button.

The datum field of an object stored in the Repertory region may contain two subfields, namely, an off-line subfield, which is always present, and an on-line subfield, which may or may not be present. The on-line datum subfield is present when its associated object defines a repertory dial button that is used to establish a data communications connection, for example, a connection to transaction processor 200. More specifically, if an on-line datum subfield is present, then that subfield is preceded by a special control character (e.g., S) which directs the associated station set to wait for carrier tone. Thereafter, when the data connection is established then the associated object may cause the station set to transmit that object as an event message to processor 200. At that point, the station set goes on line, sends a Connected message (discussed above) to processor 200, erases the Repertory region from its associated display and activates its associated Application region. (An expanded, self-explanatory table of repertory dial control characters, including the above-mentioned S character is shown in FIG. 7.)

The Application and Command regions, which are respectively identified by identifiers (id) 1 and 2, may be used to partition the display of a station set communicating with a processor 200 transaction program. The Command region, in particular, contains a predefined suite of objects defining respective command buttons. Such command buttons, when displayed in accord with their respective policies, provide conventional functionalities across different types of transactions (applications) that may communicate with the associated station set.

For example, the application region may be first partitioned into a Message region and a region identified as A1. The A1 region is then further partitioned into a number of smaller regions, A2, A3, A4, P3, CNTRL1, etc., defining the layout of a particular screen pattern that is to be displayed. In the present illustrative example, regions A1, A2, A3 and A5 are used to specify a hierarchy of group identifiers and, in a sense, are dummy regions. Regions CNTRL1, P1, P2, USER and CNTRL2, on the other hand, define the way in which a screen, or display, is to be partitioned for the display of objects, or symbols, in those regions. An illustrative example of such an application layout is shown FIG. 8.

It is noted that the dotted lines shown in FIG. 8 are not displayed and are used for the purpose of illustrating the way in which a particular station set has elected to partition its display into the latter regions in response to receiving instructions to do so from the transaction processor. It is seen from FIG. 8, which illustrates a particular banking application, that the station set has displayed different objects in the specified regions, in which the objects are defined by respective CREATE commands issued by the transaction processor. (The various instructions for directing a terminal to display the screen of FIG. 8 are shown in appendix A.)

We turn now to a discussion of the programs which implement the invention in a transaction program, e.g., processor 200, and a computer type terminal, e.g., station set 10.

Figure 9:
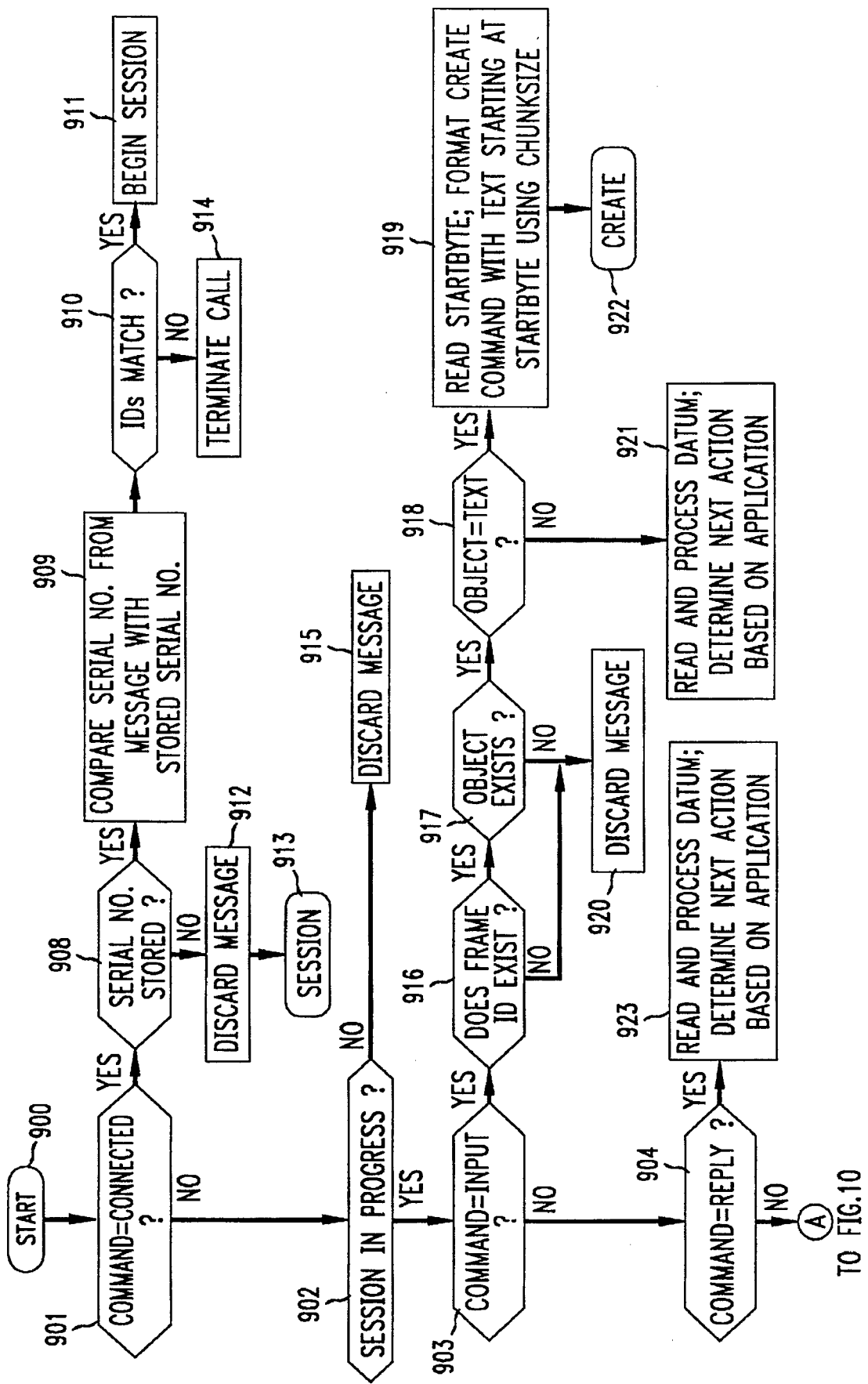
FIGS. 9–12 illustrate in flow chart form the program which implements the principles of the invention in the transaction processor of FIG. 1.
Figure 10:
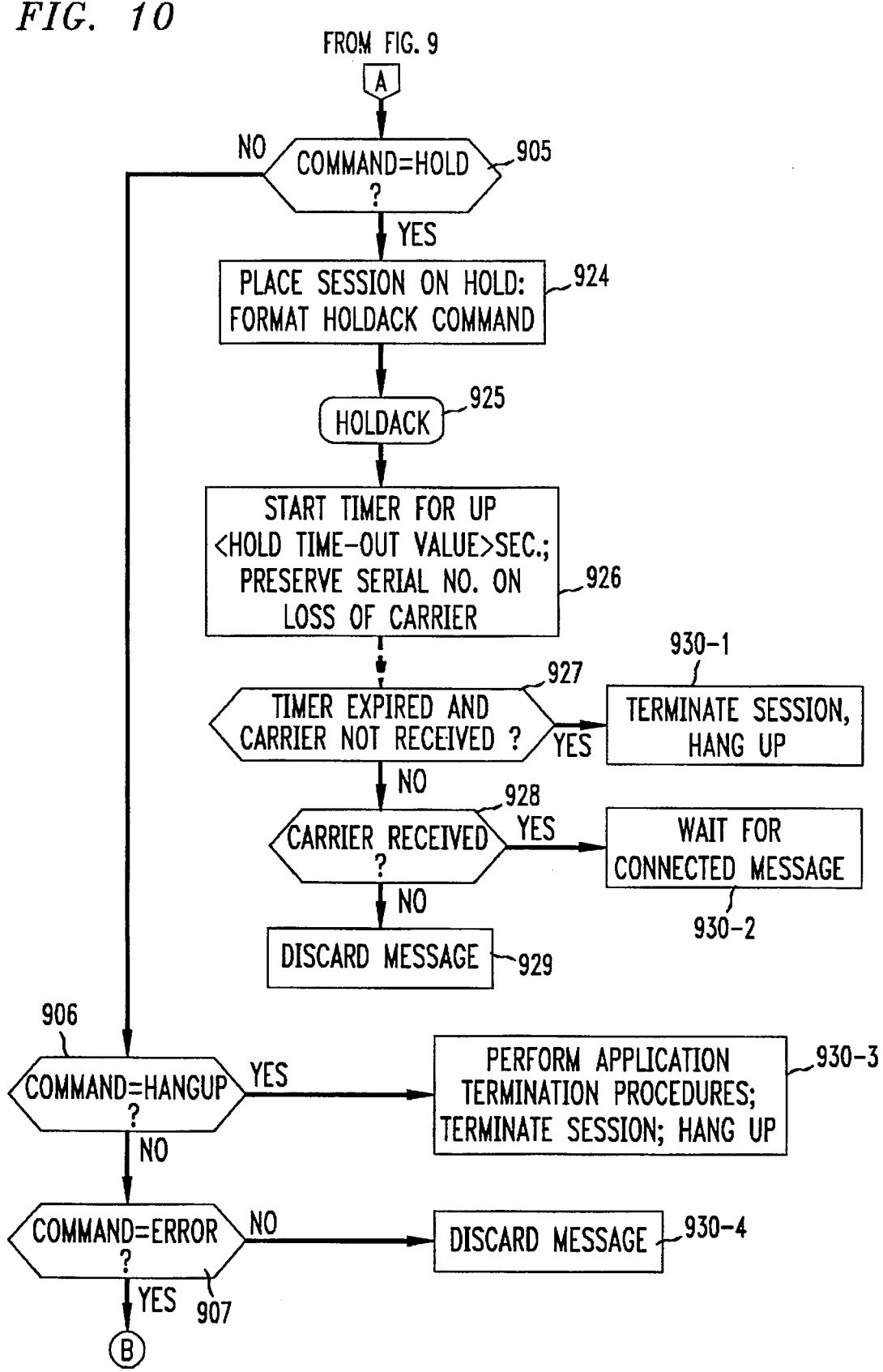
Figure 11:
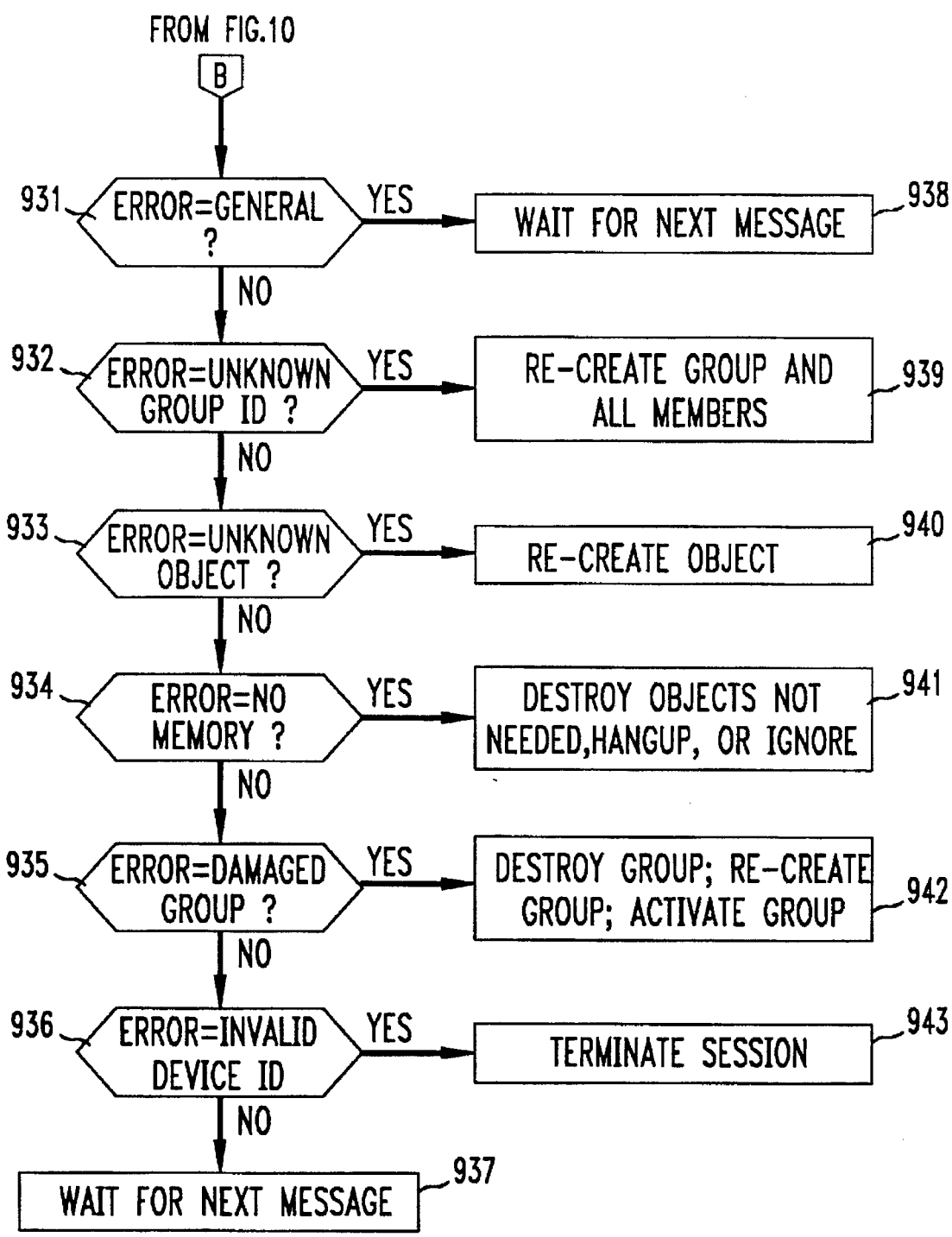

Specifically, FIGS. 9–11, show in flow chart form the program which implements the invention in transaction processor 200 (FIG. 1). The program may run under any one of a number of different types of user provided transaction programs that operates independent of the processor 200 program. Accordingly, the particular transaction program itself is not shown in the FIG.

The processor 200 program (hereinafter "program"), more particularly, is entered at block 900 in response to receipt of a message, presumably from a station set that is in communications with the processor. The program then proceeds to block 901 where it starts a series of determinations to identify the received message. If the received message is not a connected message, then the program proceeds to block 902. Otherwise, the program proceeds to block 908 where it checks to see if the station set's serial number contained in the message is associated with the communications port circuit that received the message. If that is not the case, then the program proceeds to block 912 where it discards the message and then proceeds to block 913 where it transmits a session message to the station set as a way of attempting to establish communications with the station set.

If the program finds that there is an association between the station set serial number and port, then it proceeds to block 909 where it compares the serial number in the message with a serial number that it stored in memory for the current session and that is associated with the aforementioned port circuit. If the serial numbers compare, indicating that the message is a retransmission of the connected message, then the program proceeds via block 910 to block 911 where it transmits a session message to the station set as a way of acknowledging receipt of a received connected message. If the serial numbers do not compare, then the program proceeds via block 910 to block 914 where it terminates the call.

At block 902, the program checks to see if a transaction session is in progress and proceeds to block 903 if that is the case. Otherwise, the program proceeds to block 915 where it discards the message. At block 903, the program determines if the newly received message is an event message indicative of input from the station set and proceeds to block 916 if that is case. Otherwise, the program proceeds to block 904.

At block 916, the program determines if the message contains a valid frame identity (id) (discussed below), and proceeds to block block 917 if that is the case. Otherwise, the program proceeds to block 920 where it discards the message. At block 917, the program proceeds to block 918 if the message contains a valid object id. Otherwise, it proceeds to block 920. At block 918, the program proceeds to block 919 to process a request for a chunk of text or block 921 if the message contains text or data, respectively. At block 919, the program forms a Create command, in which the text field contains a chunk of text the size of which conforms with the chunksize associated with the device communicating with the transaction processor and in which the beginning of the chunk of text corresponds with the value of the startbyte contained in the received message. The program (block 922) then transmits the Create command containing the requested text. At block 921, the program processes the data contained in the message and then determines the next action it should take based on the type of application (transaction) that is communicating with the sending station set.

At block 904, the program proceeds to block 923 if the message is a reply to a query generated by the application program. Otherwise, the program proceeds to block 905. At block 923, the program processes the reply data contained in the message and then determines the next action it should take based on that data and the particular application that is communicating with the sending station set. At block 905, the program proceeds to block 924 if the received message is a "Hold" command requesting that the current session be placed on hold as is done with a conventional telephone call. Otherwise, the program proceeds to block 906.

At block 924, the program places the session on hold and then proceeds to block 925 where it transmits an acknowledgment (HOLDACK) that has been placed on hold. At block 926, the program starts a software timer geared to time for a predetermined period of time, e.g., 10 minutes, at the end of which the program (blocks 927 and 930) terminates the call if it does not receive a carrier signal and a connected message from the station set. This action is invoked to prevent an indefinite hold time which would occur if the user does not re-establish the session. More particularly, at the end of the aforementioned period of time, as represented by the dashed line leaving block 926, the program is re-entered at block 927 where it proceeds to block 928 to determine if a carrier signal is indeed being received, or block 930-1 if that is not the case. At block 929, the program terminates the session and associated telephone call. Whereas, at block 930-2, the program waits for the receipt of a connected message to re-establish the particular application session with the user's station set.

At block 906, the program proceeds to block 930-3 where it terminates the session as a result of determining that the received message is a "hangup" command. If that is not the case, then the program proceeds to block 907 to determine if the message is an error message. If it is not, then the program (block 930-4) discards the received message. Otherwise, the program proceeds to identify the type of error that is represented by the contents of the received message. Blocks 931 through 936, more particularly, perform that function and associated blocks 938 through 943 invoke the appropriate action based of the type of error identified in the received message. If the error cannot be identified then, at block 937, the program discards the received message.

Figure 12:
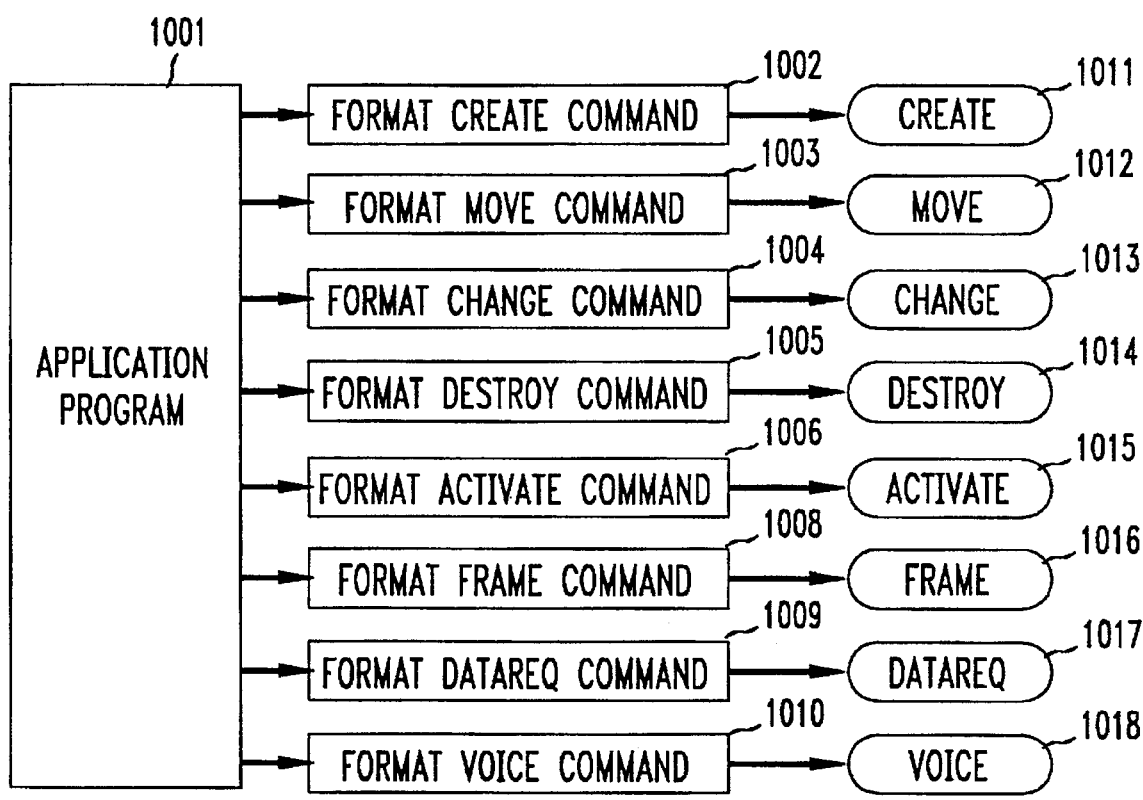

FIG. 12 illustrates in flow chart form the actions that the communications protocol program invokes with respect to receipt of a particular type of command received from an associated application program represented by block 1001. When the instant program receives a particular one of the commands identified at blocks 1002 through 1010, the program associates the command with an identifier (id) and group identifier (gid) and then transmits the command, as represented by blocks 1011 through 1018, respectively.

Figure 13:
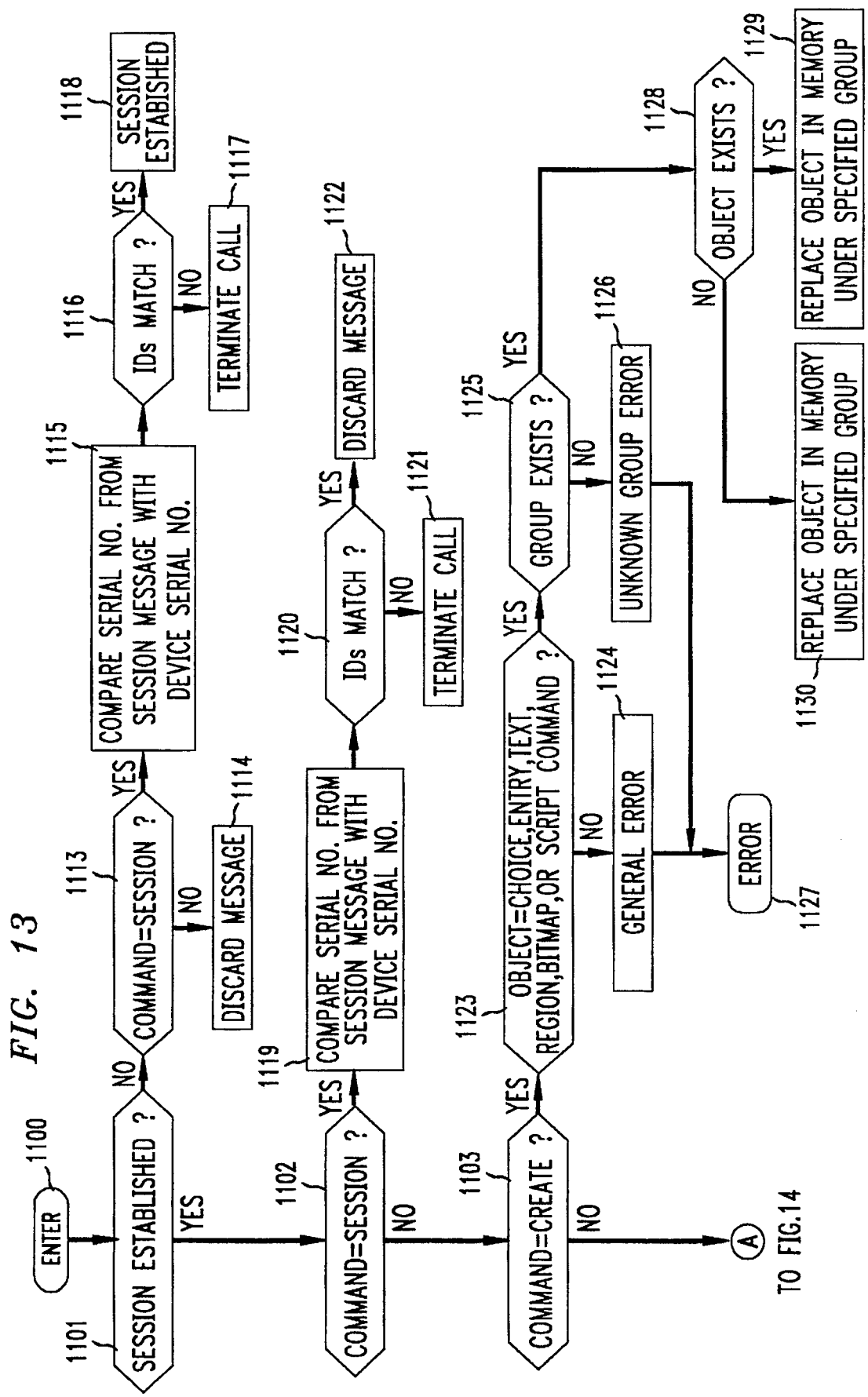
FIGS. 13–17 illustrate in flow chart form the program which implements the principles of the invention in a computer type terminal or similar device, such as one of the terminals of FIG. 1.
Figure 14:
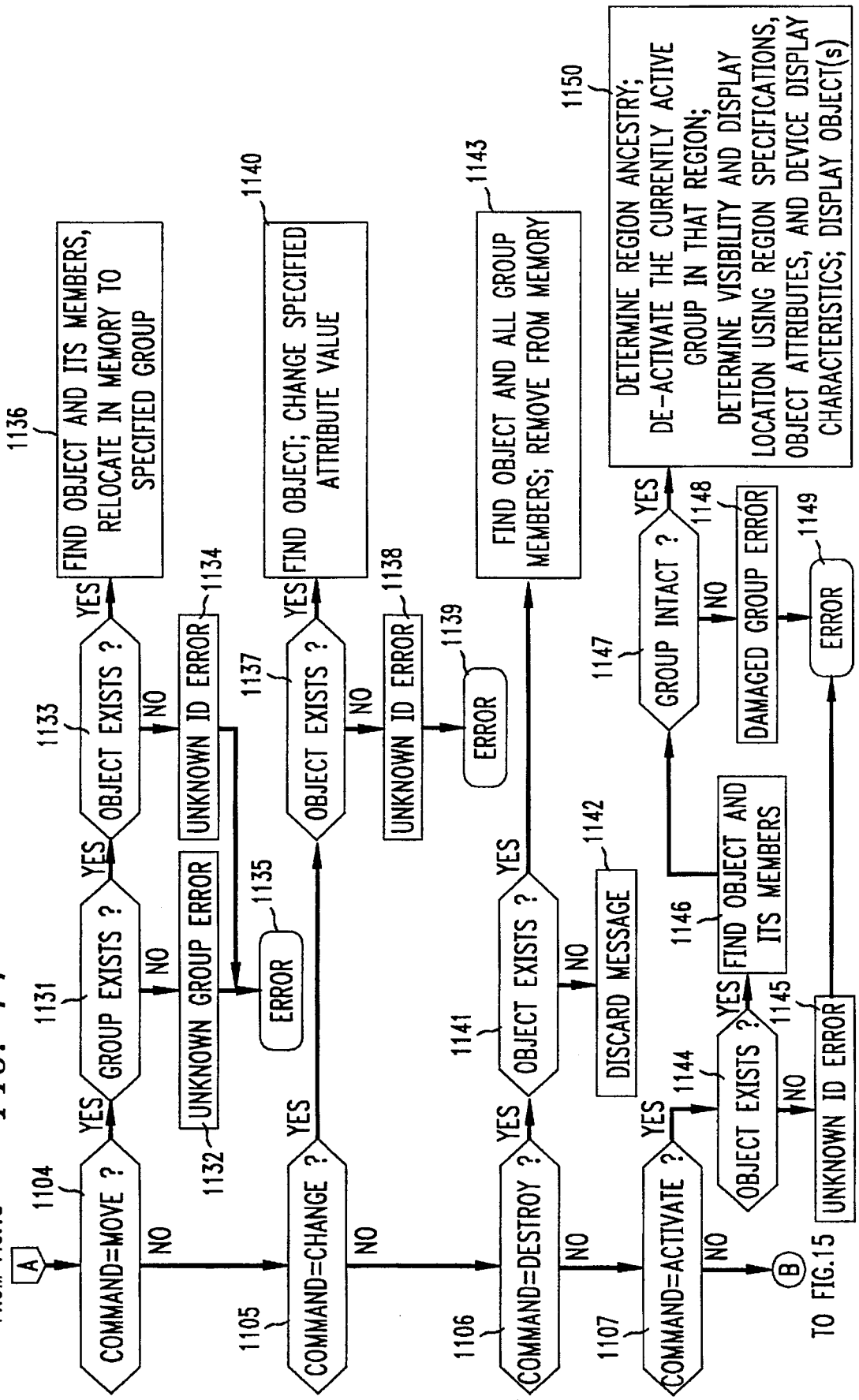
Figure 15:
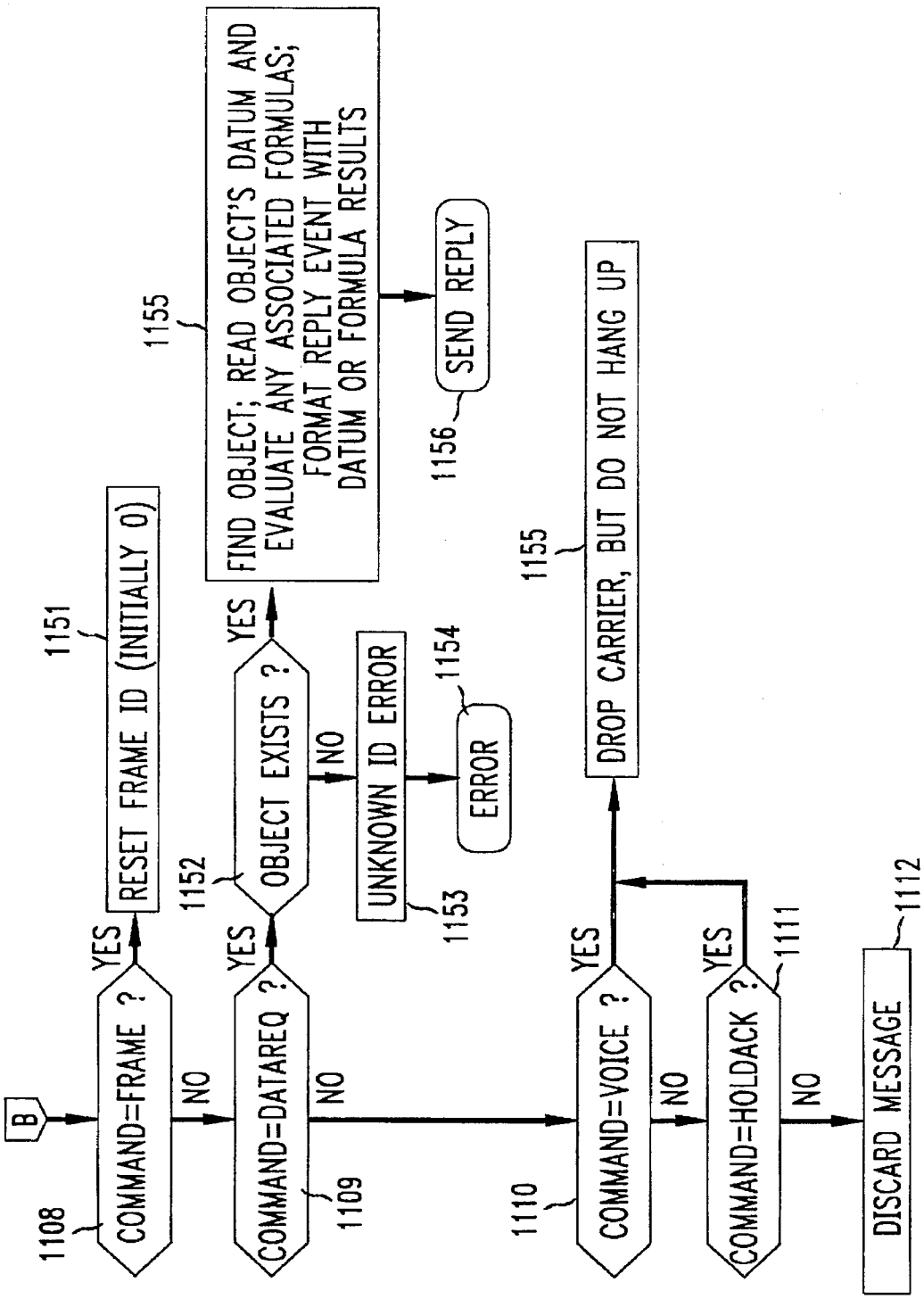

FIGS. 13–15 show in flow chart form the program which implements the inventive communications protocol in a data terminal, such as a smart phone, e.g., station set 10 (FIG. 1). In particular, the program is entered at block 1100 upon receipt of a message containing a command and proceeds to block 1101 to begin the processing thereof. More particularly, at block 1101, the program checks its associated memory to determine if a transaction session is in progress and proceeds to block 1102 if it finds that to be the case. Otherwise, it proceeds to block 1113 to determine if the received message is a session message. If it is not, then the program proceeds to block 1114 where it discards the message and then exits. If it is, then the program proceeds to block 1115 where it compares the serial number contained in the message with the serial number of its associated device, i.e., station set 10. If the serial numbers match (block 1116) then the program proceeds to block 1118 where it notes in its associated memory that a session has been established. If those numbers do not match, then the program proceeds to block 1117 where it discards the message and then exits to await receipt of the next message.

If the received message happens to be a session message then the program proceeds from block 1102 to block 1119. Otherwise, it proceeds to block 1103. It is seen from the FIG. that the actions taken at blocks 1119 through 122 are similar to those taken at blocks 1113 through 1118, respectively, except for the fact that if the aforementioned serial numbers (IDs) match then the program discards the received message since it is representative of information already known by the program.

At block 1103, the program proceeds to either block 1104 or block 1123 based on whether or not the received message is a Create command. At block 1123, the program proceeds to block 1125 if it finds that the latter command is one of the create commands discussed above and proceeds to block 1124 if finds that is not the case. Block 1124 represents an error condition and marks an error flag to identify the error and then proceeds to block 1127 to process the error. That is, the program formats the error into a message and then sends the message to transaction processor 200.

At block 1125, the program proceeds to block 1128 if it finds that the received command is associated with a previously defined group. Otherwise, it proceeds to block 1126 to mark the aforementioned error flag as being an unknown group error and then proceeds to block 1127 to process the error. At block 1128, the program proceeds to block 1129 or 1130 based on whether the object defined in the received message has been previously defined. If it has, then the program (block 1129) replaces the priorly stored object with the object command contained in the received message. If it has not, then the program (block 1130) stores the received command in memory in relation to its associated group.

At block 1104, the program proceeds to block 1131 or 1105 based on whether the received message contains a Move command. At block 1131, the program checks to see if the associated group is stored in memory and proceeds to block 1133 if it finds that to be the case. Otherwise, the program proceeds to block 1132 where it sets the aforementioned error flag to indicate an unknown group error and then proceeds to block 1135 to process the error in the manner done at block 1127. At block 1133, the program checks to see if the object identified in the received message exists in memory and proceeds to block 1136 if it finds that to be the case. Otherwise, it proceeds to block 1134 where it sets the aforementioned error flag to indicate an unknown identification (ID) error and then proceeds to block 1135 to process the error, in the manner discussed above. At block 1136, the program associates (moves) the object identified in the received message with the group that is also identified in that message and then exits to await receipt of the next message.

At block 1105, the program proceeds to block 1106 or 1137 based on the received message containing a Change command. At block 1137, the program checks to see if the object is identified in memory and proceeds to block 1140 if that is the case. Otherwise, it proceeds to block 1138 to note the particular error condition and proceeds to block 1139 to process the error. At block 1140, the program locates the specification of the object in memory and then changes the specification in accord with the directions contained in the received message.

At block 1106, the program proceeds to block 1141 if the message happens to contain a Destroy command. Otherwise, it proceeds to block 1107. At block 1141, the program performs the same function as block 1137 and then proceeds to block 1143 if the result is true. If the result is not true, then it proceeds to block 1142 where it discards the message and waits for receipt of the next message. At block 1143, the program erases from its memory the object identified in the received message as well as other objects associated with that object, i.e., are associated with the same group At block 1107, the program proceeds to block 1108 or 1144 based on whether the received message contains an Activate command. Block 1144, like blocks 1137 and 1141, checks to see if the object id contained in the received message is valid, i.e., is contained in memory. If it is, then the program proceeds to block 1146. Otherwise, it proceeds to block 1145, which, in conjunction with block 1149, performs an action similar to the action performed at blocks 1138 and 1139. At block 1146, the program locates the identified object and then proceeds to block 1147 where it checks to see if all of the objects associated with same group id are still specified in memory (intact) and therefore had not been priorly overwritten by an action taken in conjunction with a priorly received message. If the program finds that the group is not intact, then it proceeds to block 1148 where it notes the particular error condition in the aforementioned error flag and then proceeds to block 1149 to process the error in the manner discussed above. If the program finds the group is intact then it proceeds to block 1150 where it activates the associated object as specified by block 1150.

At block 1108, the program checks to see if the received message contains a Frame command and proceeds to block 1151 if it finds that to be the case. Otherwise, it proceeds to block 1109. (It is noted that a frame is the collection of objects and/or groups of objects that are displayed concurrently on a display or screen. For example, FIG. 8 represents such a frame, or screen, of displayed objects. Such a frame may also include objects (text) that can be displayed by scrolling. As an aspect of the invention, a frame is associated with a frame id, which the transaction processor transmits to a device, e.g., station set 10, via a FRAME or SCREEN command. A SCREEN command is a macro which defines a series of ACTIVATE commands and is followed by a FRAME command. In practice, a SCREEN command is used as an encoding optimization facility to reduce the chance of a race condition occurring in the instance where a user touches or enters a displayed button following receipt of the ACTIVATE commands but before receipt of an associated FRAME command. Accordingly, each input event message that a device transmits to a transaction processor includes the associated frame id so that the transaction processor may correlate the event message with the appropriate frame. In this way, the transaction processor may ignore receipt of a duplicate of an already received event message. For example, if the transaction processor receives a DONE event message associated with a frame id of 123 and then begins to process that message and a short time later receives the same message bearing the same FRAME id, then the transaction processor may ignore the second, or duplicate message.)

At block 1151, the program updates the Frame id to a value contained in the received message. The program then waits for receipt of the next message. At block 1109, the program determines if the received message contains a data request (Datareq) and proceeds to block 1152 if that is the case. Otherwise, the program proceeds to block 1110. At block 1152 the program checks the validity of the object noted in the received message and proceeds to block 1153 if it finds that the object does not exit, i.e., had not been previously defined. Otherwise, the program proceeds to block 1155. The program at blocks 1153 and 1154 performs the same function that is performed by blocks 1145 and 1149. At block 1155, the program locates the specification for the object in memory, unloads all data and formula data and then formats a reply message. The program then proceeds via block 1156 to send the reply to transaction processor 200, as will be discussed below.

At blocks 1110 and 1111, the program causes its associated station set to drop (terminate) the modem carrier signal, but not the call. This action is typically done prior to establishing a voice call, such as a call to an agent associated with the transaction that is in communication with the associated station set. If the program finds that the received message does not contain a Voice or Holdack (Hold acknowledgement) command, then the program discards the received message and then waits for receipt of the next message.

Figure 16:
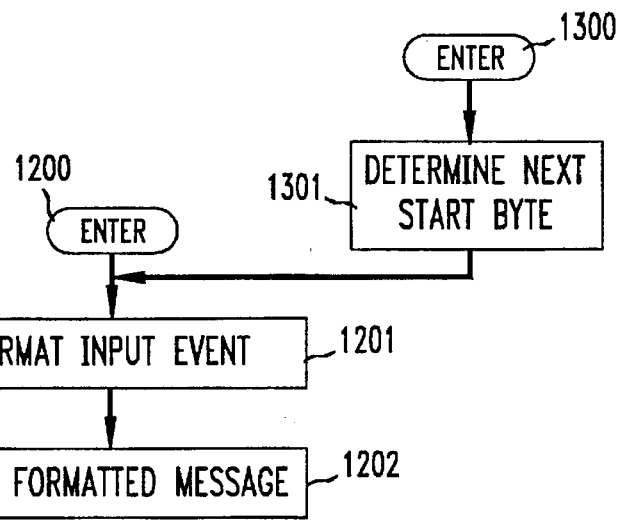

FIG. 16 illustrates the program module which formats and then transmits a message to transaction processor 200. In particular, the program module is entered at block 1200 when a user either selects a displayed Choice object or enters information in response to a displayed request for the entry of information (Entry object). At block 1200, the program module proceeds to block 1201 where it formats a user selection or user entered information into a message and then proceeds to block 1202 where it transmits the message. The program then exits to await the transmission of the next user selection or entered information. Alternatively, the program is entered at block 1300 whenever the user requests the display of text, i.e., is scrolling through displayed text and requests additional text or text that had been previously displayed. When entered at block 1300, the program proceeds to block 1301 to determine the startbyte of the next chunk size of text that is to be displayed on the user's station set. The program then proceeds to block 1201, where, as mentioned above, the program formats the request into an input message and then transmits the message at block 1202.

Figure 17:
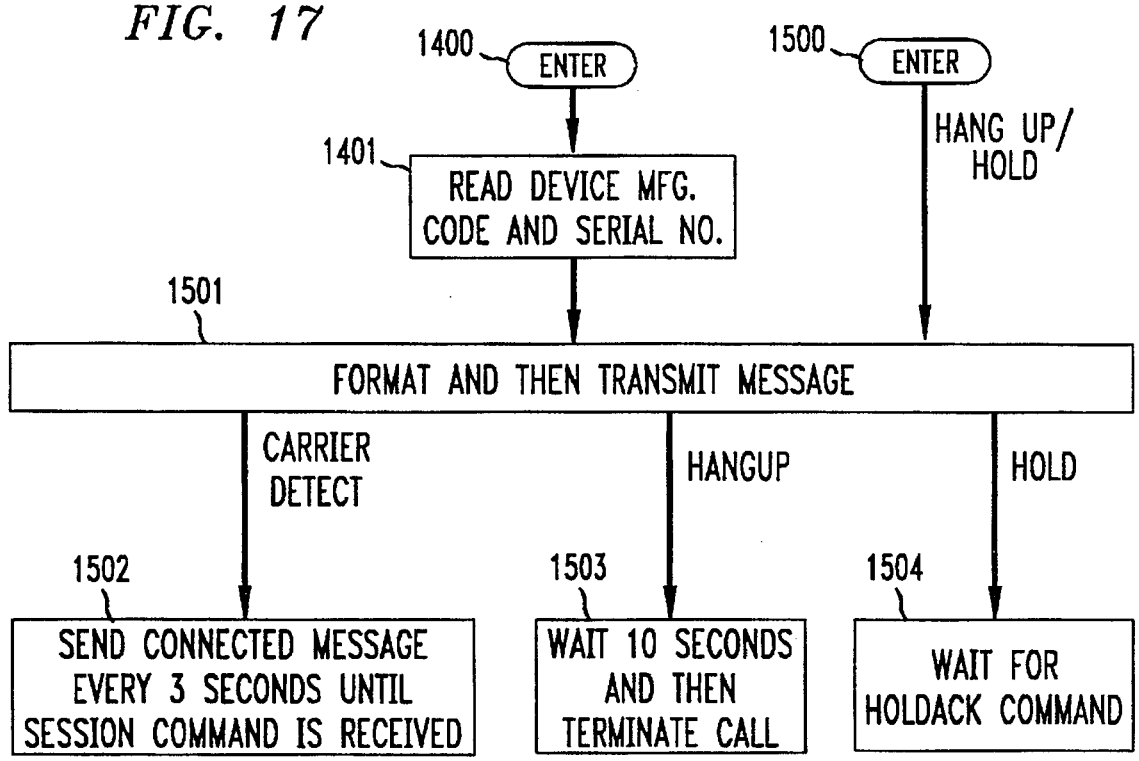

FIG. 17 illustrates another program module which formats and then transmits differents messages to transaction processor 200 and which has two entry points, namely blocks 1400 and 1500. In particular, the program is entered at block 1500 when the user enters a request to terminate the current session (i.e., hangs up) or places the current session on hold. When the program is entered at block 1500 it proceeds to block 1501 where it format the user's request into a message and then transmits the message. The program then proceeds to either block 1503 or block 1504 based on the type of message that is being transmitted, as indicated in the FIG. At block 1503, the program waits for a predetermined period of time, e.g., 10 seconds, and then terminates the session. At block 1504, the program waits for receipt of a processor 200 message acknowledging a hold request (i.e., Holdack command). The program module is entered at block 1400 when receipt of a carrier signal is detected via an associated telephone line. Such detection occurs at the end of a Hold state or when a telephone connection is first established between the associated station set and processor 200. Upon being so entered, the program proceeds to block 1401 where it unloads from its associated memory the manufacturing code and serial number assigned to its associated device, e.g., station set 10. The program then proceeds to block 1501 where it formats a connected message using the unloaded information and then transmits the message to processor 200. The program then proceeds to block 1502 where it continues to send the connected message to processor 200 every three seconds until a session command is received from processor 200.

The foregoing is merely illustrative of the principles of the invention. Those skilled in the art will be able to devise numerous arrangements, which, although not explicitly shown or described herein, nevertheless embody those principles and are within the spirit and scope of the invention.

APPENDIX A

```
O:SESSION:ABCDEF01
O:DATAREQ
O:DESTROY
7:CHANGE:GENATTR:HIDE
1:CHANGE:GENATTR:HIDE
```

APPENDIX A-continued

```
64:CREATE:1:REGION::::
65:CREATE:1:REGION::::
66:CREATE:64:REGION::::
71:CREATE:64:REGION::::
69:CREATE:66:REGION::::
70:CREATE:66:REGION::::
72:CREATE:65:REGION::::
67:CREATE:65:REGION::::
68:CREATE:67:REGION::::
73:CREATE:68:REGION::::
74:CREATE:68:REGION::::
75:CREATE:67:*REGION::::
268435457:CREATE:69:CHOICE:::::
268435458:CREATE:70:CHOICE:::::
268435459:CREATE:71:CHOICE:::::
268435460:CREATE:72:CHOICE:::::
268435461:CREATE:75:CHOICE:::::
112:CREATE:73:CHOICE:::::
113:CREATE:112:ENTRY::NUMBER:ID:Enter ID:8:
268435463:C*REATE:74:CHOICE:::::
101:SCREEN:268435457:268435458:268435459:268435460:268435461:112:268435463
4:CHANGE:GENATTR:HIDE
5:CHANGE:GENATTR:HIDE
6:CHANGE:GENATTR:HIDE
1:CHANGE:GENATTR:
114:CREATE:73:CHOICE:::::
115:CREATE:114:ENTRY::NUMBER SECURE:Password:Enter secret code:8:
102:SCREEN:114
100:CREATE:69:CHOICE:::::
101:CREATE:100:TEXT::PROMPT:O:HOME                                 ^JBANKING
152:CREATE:70:CHOICE:::::
153:CREATE:152:TEXT::PROMPT:0:07/13/92                             10:12 AM ^JTouch BUTTON
FOR DESIRED ITEM:
102:CREATE:72:CHOICE:::::
103:CREATE:102:CHOICE::COMMAND:NEW: TOUCH HERE TO SEE CURRENT CD AND
LOAN RATES:
104:CREATE:75:CHOICE:::::
105:CREATE:104:CHOICE::COMMAND:TOUCH HERE TO TALK TO YOUR HOME
BANKER:
116:CREATE:73:CHOICE:::::
117:CREATE:116:CHOICE::COMMAND NOTOUCH::
118:CREATE:116:CHOICE::COMMAND:BANK AT HOME:
119:CREATE:116:CHOICE::COMMAND:PAY A BILL:
120:CREATE:116:CHOICE::COMMAND:STOCK/BONDS:
121:CREATE:116:CHOICE::COMMAND:STOP ORDER:
122:CREATE:116:CHOICE::COMMAND:TRAVEL CHECKS:
123:CREATE:116:CHOICE::COMMAND:SERVICES:
103:SCREEN:100:152:102:104:116
```

We claim:

1. A method of operating a host processor communicating with a terminal device, said method comprising the steps of assigning an identifier to a respective one of a plurality of input object types, and transmitting said identifier and its respective input object type to said device, wherein said plurality of object types includes at least two of the object types choice, entry, text, and image.

2. A method of operating a host processor communicating with a terminal device, said method comprising the steps of assigning an identifier to a respective one of a plurality of input object types, transmitting said identifier and its respective input object type to said device, and responding to a manipulation of the object at said terminal by transmitting to said processor a) said identifier and b) data representative of said manipulation, wherein said manipulation includes at least selection of said object; entry of data; or retrieval of display data.

3. A method of operating a host processor communicating with a terminal device, said method comprising the steps of assigning an identifier to a respective one of a plurality of predefined presentation data types, said host being the originator of said identifier and said presentation data types, transmitting said identifier and its respective presentation data type to said device, and responsive to a manipulation of said respective presentation data type at said terminal device, transmitting to said processor said identifier and data representative of said manipulation, and further comprising the step of further transmitting to said device at least a first datum, and wherein said data representative of said manipulation includes said first datum.

4. A method of operating a host processor communicating with a terminal device, said method comprising the steps of assigning an identifier to a respective one of a plurality of predefined presentation data types, said host being the originator of said identifier and said presentation data types, transmitting said identifier and its respective presentation data type to said device, and responsive to a manipulation of said respective presentation data type at said terminal device, transmitting to said processor said identifier and data representative of said manipulation, further transmitting to said device at least a first datum, wherein said data representative of said manipulation includes said first datum and wherein said respective presentation data type is representative of one of a plurality of different object types, and presenting said first datum as a default data entry value for said one object type.

5. A method of operating a host processor communicating with a terminal device, said method comprising the steps of assigning an identifier to a respective one of a plurality of predefined presentation data types, said host being the originator of said identifier and said presentation data types, transmitting said identifier and its respective presentation data type to said device, and further transmitting to said device at least a first datum, and providing at said device a second datum that is a function of said first datum.

6. The invention of claim 5 wherein said second datum comprises data available at said device but not available at said host processor.

7. The invention of claim 6 wherein said first datum is a function call.

8. The invention of claim 5 wherein said respective presentation data type is representative of one of a plurality of different object types and wherein said method further comprises the step of presenting said second datum at said device as a label for said one object type.

9. The invention of claim 5 wherein said respective presentation data type is representative of one of a plurality of different object types and wherein said method further comprises the step of presenting said second datum at said device as a default data entry value for said one object type.

10. The invention of claim 5 further comprising the step of responsive to a manipulation of said respective presentation data type at said terminal device, transmitting to said processor said identifier and data representative of said manipulation, wherein said data representative of said manipulation includes said second datum.

* * * * *